June 24, 1941. J. K. NORTHROP ET AL Re. 21,841
ANCHOR
Original Filed Nov. 20, 1933 3 Sheets-Sheet 1
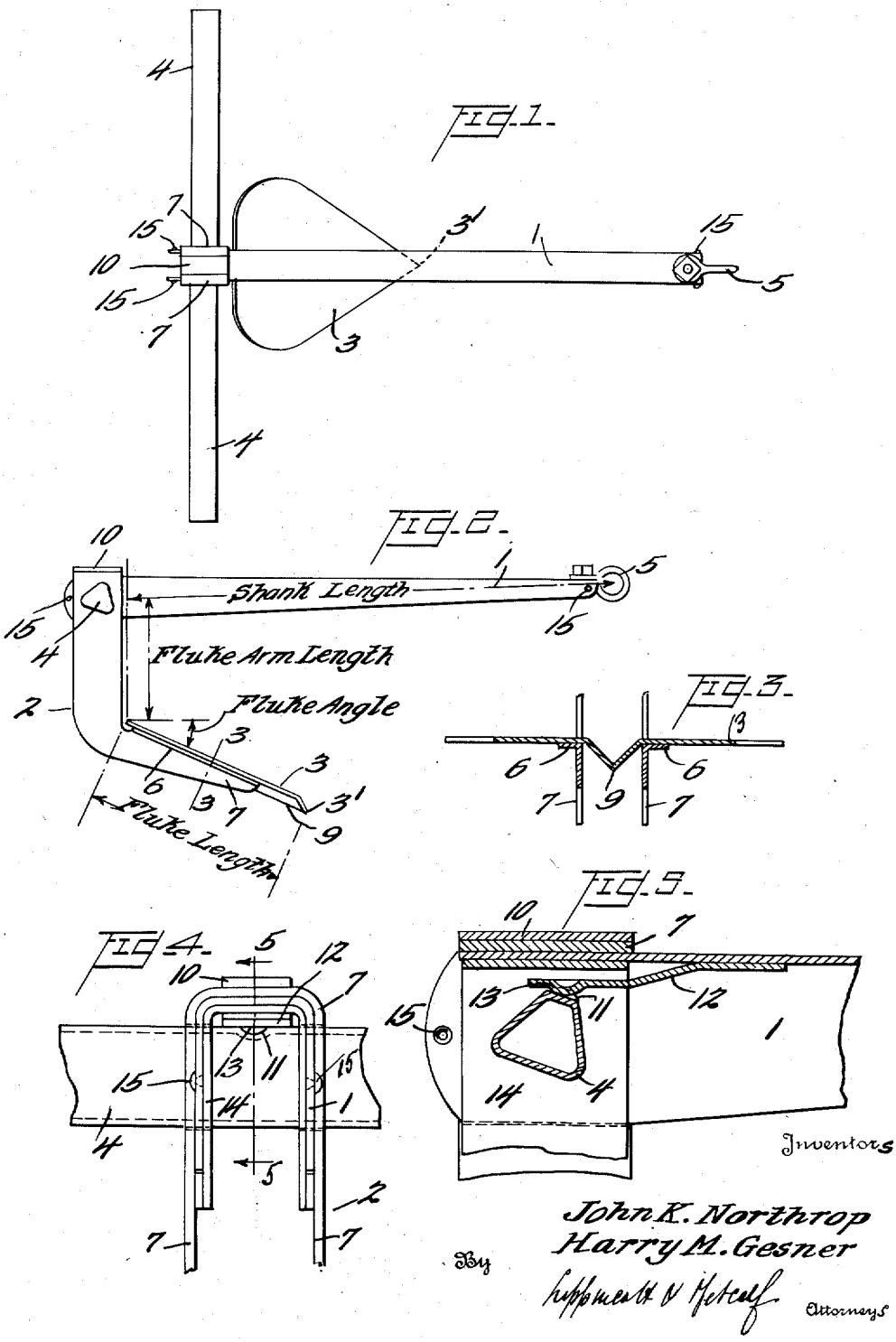

June 24, 1941. J. K. NORTHROP ET AL Re. 21,841
ANCHOR
Original Filed Nov. 20, 1933 3 Sheets-Sheet 2
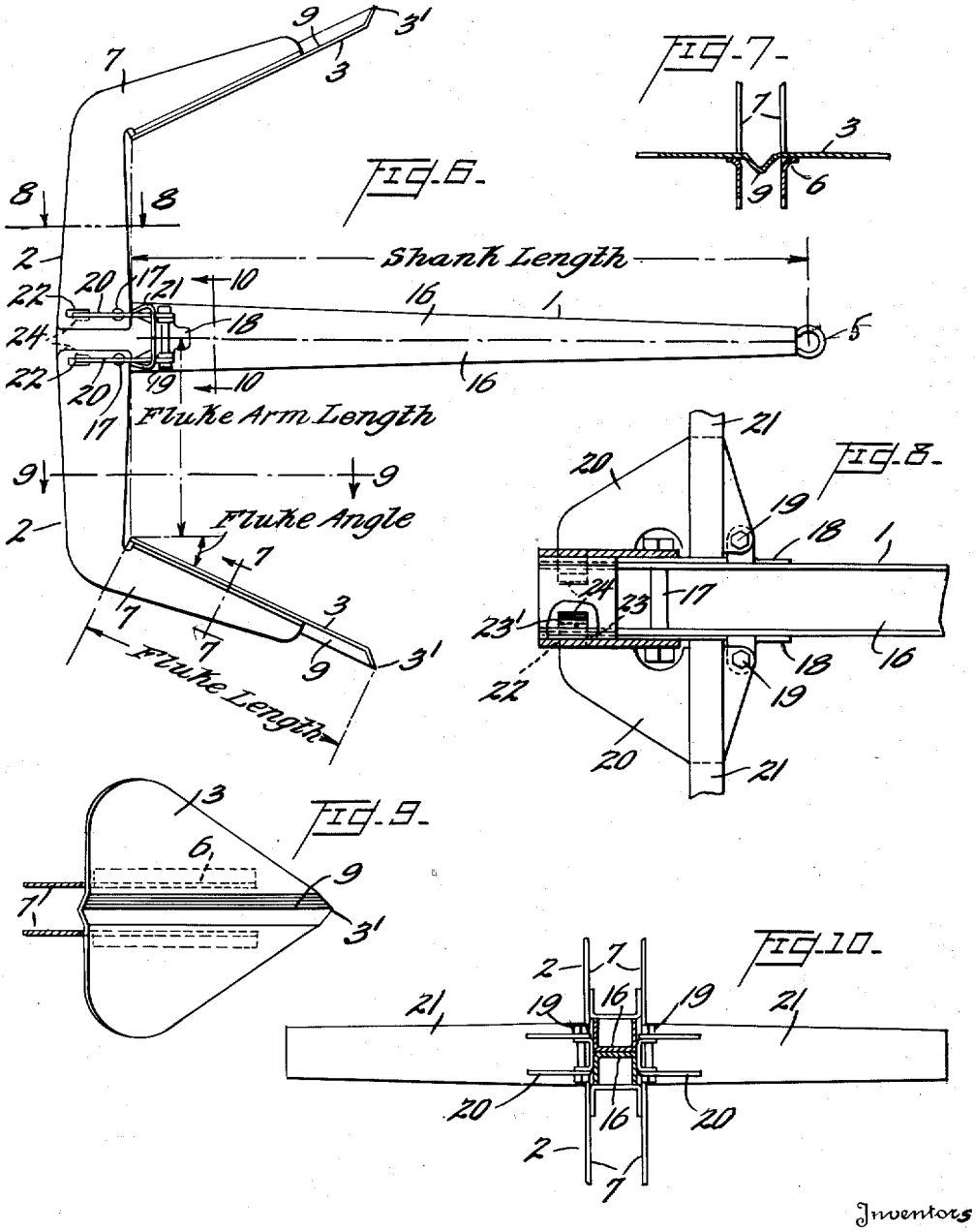
Inventors
John K. Northrop
Harry M. Gesner
By Lippincott & Metcalf Attorneys INVENTORS,
JOHN K. NORTHROP,
HARRY M. GESNER.
BY Lippincott & Metcalf
ATTORNEYS.

Reissued June 24, 1941 Re. 21,841

UNITED STATES PATENT OFFICE 21,841

ANCHOR

John K. Northrop, Los Angeles County, and Harry M. Gesner, Santa Monica, Calif.

Original No. 2,075,827, dated April 6, 1937, Serial No. 698,776, November 20, 1933. Application for reissue July 17, 1939, Serial No. 284,970

18 Claims. (Cl. 114—207)

Our invention relates to anchors such as may be used for mooring or holding all types of movable objects, particularly water craft, and more particularly to anchors of the shank and fluke type designed to develop holding power largely independent of the weight of the anchor.

Among the objects of our invention are: to provide an anchor having an unusually large ratio of holding power to weight; to provide an anchor which will penetrate the bottom by the angular positioning of a planar fluke; to provide an anchor having structural dimensions and angular relationships as will enable the anchor to bury itself in penetrable bottom; to provide an anchor of exceptionally light weight which may be used, for example, in places where weight is at a premium; to provide a simple and efficient airplane anchor; to provide an anchor which may be folded in compact form for easy stowage; and to provide an anchor operating by virtue of planing characteristics rather than by weight.

Other objects of our invention will be apparent or will be specifically pointed out in the description forming a part of this specification, but we do not limit ourselves to the embodiment of the invention herein described, as various forms may be adopted within the scope of the claims.

In the drawings which illustrate several preferred embodiments of our invention:

Figure 1 is a top view of a single fluke anchor.

Figure 2 is a side view of the anchor shown in Figure 1.

Figure 3 is a cross sectional view through a fluke, taken as indicated by the line 3—3 in Figure 2.

Figure 4 is a view in elevation, showing the junction of a fluke arm shank and stock as viewed from the rear.

Figure 5 is a sectional view, taken as indicated by the line 5—5 in Figure 4.

Figure 6 is a side elevational view of a double fluke anchor.

Figure 7 is a cross sectional view of the fluke arm, taken as indicated by the line 7—7 in Figure 6.

Figure 8 is a sectional view, taken as indicated by the line 8—8 in Figure 6.

Figure 9 is a view, partly in section and partly in elevation, taken as indicated by the line 9—9 of Figure 6.

Figure 10 is a cross-sectional view of the shank, taken as indicated by the line 10—10 in Figure 6.

Figure 11:
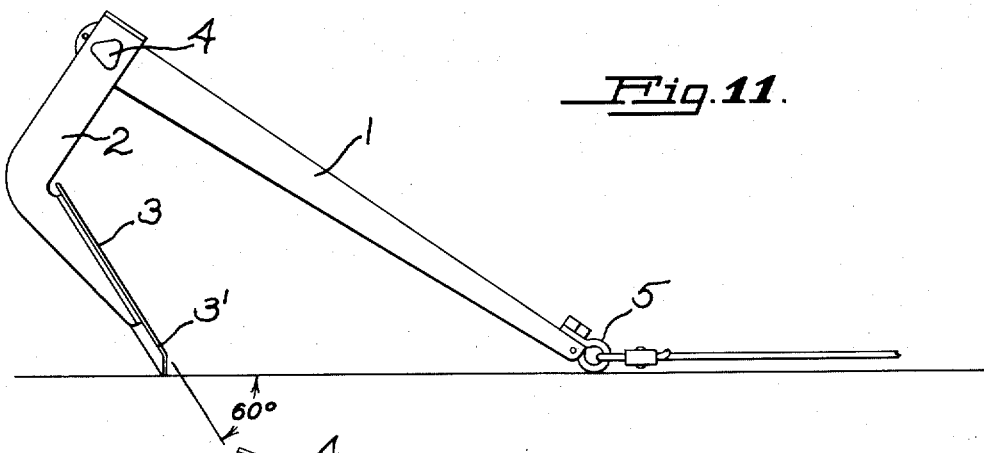
Figures 11, 12 and 13 are explanatory diagrams showing an anchor having the exact relative dimensions of the anchor shown in Figure 2, in various positions relative to penetrable bottom, as the anchor imbeds itself under a pull from an anchor cable.

Practically all existing anchors depend, to a large extent, on their weight for the holding power developed. Various types and shapes of fluke have been evolved in the past to furrow the bottom and resist dragging of the anchor by the moored craft. In general, it may be stated that the fluke sizes and shapes and their relation to the shank and line of pull in existing anchors, are such that comparatively great anchor weight is a vital necessity to the proper engagement of the fluke in the bottom, and that the fluke alone would be relatively ineffective to develop any considerable holding power if the anchor weight was substantially decreased.

This fact often has been proved in comparative tests of cast anchors of similar shape but having varying specific gravity. Attempts have been made to obtain satisfactory holding powers in anchors cast of aluminum alloys instead of bronze or iron. These tests have always shown that the holding power of the aluminum anchors is greatly inferior to the heavier types, and that weight is essential in order to obtain proper fluke engagement and holding power. The statement may be further substantiated by the fact that fluke angles which are now in almost universal use, are such that the forces under load tend to disengage the fluke from the bottom, and these forces must be counteracted by the weight of the anchor on the fluke to maintain proper engagement. The anchor of our invention employs new principles to develop its holding power.

In broad terms, the anchor of our invention has a fluke shape, fluke-shank angles, and interrelation of other parts, such that when a dragging load is applied to the shank the fluke enters the bottom and buries itself, this action being due almost solely to the pull on the shank from the anchor cable, and only in a very minor degree to the weight of the anchor.

Such an anchor may be designed on a basis of fluke size and structural strength from strong alloy steels, taking into account strength alone without regard to weight. The resulting structure will develop a much higher ratio of holding power to weight than conventional types, and at the same time is less affected by bottom conditions, as the force tending to cause entrance of the fluke into the bottom is existant regardless of the type of bottom. On the other hand, conventional types depending on weight are affected by bottom consistency, which to a large degree regulates the penetration and holding power of the fluke.

That the above theory is sound may readily be determined by comparative tests of various anchors. American and British naval aircraft organizations have conducted a large number of tests on various types of anchors for use on sea planes and flying boats where the saving of weight in particularly important. In general, these tests have shown a holding power-weight ratio for the anchors tested of from 5 to 1 to 25 to 1, depending upon the type of anchor and bottom conditions, whereas the anchor of our invention has developed ratios up to and including 200 to 1.

Referring now to the drawings, Figures 1 and 2 show two elevational views of a typical anchor of our invention, having one fluke only. Basically, the anchor comprises a shank 1, a fluke arm 2, a fluke 3, and a cross arm or stock 4. These essential parts may take various forms, but certain relationships which are essential should be maintained in order to achieve the best results. In Figures 2, 6, and 11—13, the various lengths and angles are illustrated and may be defined as follows:

1. *Shank length.*—The axial distance along the shank from the point of rope attachment to a line projected at right angles to the shank axis and touching the rear edge of the fluke at the center line thereof.

2. *Fluke arm length.*—The shortest distance from the axis of the shank to the rear edge of the fluke at the center line thereof.

3. *Fluke length.*—The length of the center line of the fluke.

4. *Fluke angle.*—The angle between a line parallel with the shank axis passing through the rear edge of the fluke at the center line thereof and the center line of the fluke.

5. *Presentation angle.*—The angle assumed by the plane of the fluke in relation to the plane of the bottom before penetration. The bottom line in this instance corresponds to a straight line drawn connecting the tip of the fluke and the cable end of the shank.

6. *Planing angle.*—The angle assumed by the plane of the fluke to bottom as a point approximating the center of area of the fluke registers with the bottom. The bottom line in this instance corresponds to a straight line drawn connecting a point approximating the center of area of the fluke and the point of cable attachment to the shank. The center of area need only be approximately determined and can readily be found by inspection. In the heartshaped fluke, shown in Figures 6 and 9, the center of area lies substantially in the section-line 7—7 in Figure 9, this section being shown in Figure 7. The important function of the above set forth relationship is to have a substantial amount of the fluke area buried when the fluke presents a 45° angle to the bottom in order that the optimum planing action shall occur to bury the remainder of the fluke against the pull of a cable.

7. *Holding angle.*—The angle assumed by the plane of the fluke to bottom after full penetration with the shank substantially parallel to the bottom. Normally this angle substantially corresponds to the fluke angle.

As an example, for a ratio of fluke arm length to shank length of 1 to 3 and a ratio of fluke length to shank length of 1 to 2½, a fluke angle of 21° is satisfactory. If the fluke angle is increased to 26° the shank length should be increased 30%, and if the fluke angle is 35° the shank should be increased in length 60% for best results. In general, it may be stated that 25° is approximately the best fluke angle for an anchor of reasonable proportions, and that the maximum fluke angle for best results with an unusually long shank is around 35°. All of these ratios are correlated to maintain initial presentation angles of not exceeding 60° and planing angles of approximately 45°.

In this connection it is interesting to note that in a series of many examples of the ordinary type of fluke and shank anchors depending on weight for their holding power, tested by various agencies, the fluke angle varied from 35° to 70°, with the large majority near the high limit, further establishing the fact that the tested anchors were principally dependent on weight for the engagement of fluke and bottom.

Fluke arm length, shank length, and fluke angles, can be varied through rather wide limits if they are so varied as to maintain the presentation angles and planing angles substantially as above mentioned. Obviously, variation of fluke arm length, fluke angle being the same, varies the shortest distance from fluke tip to shank axis and therefore varies the presentation and planing angles, but not the fluke angle. Ratios of fluke arm length to shank length of from 1 to 6 to 1 to 3 give good results. Some advantages attend the use of the longer fluke arms, however, as such proportions allow the fluke to bury itself more deeply and develop greater holding power. The deeply buried fluke also produces a pitching moment which buries the cable end of the shank and helps it to resist high angles of cable pull.

We prefer to form the anchor of our invention, for the efficient functioning of the device, of high strength alloys such as stainless steel for example. These alloys are used not only to save weight but also to allow the various parts to be made as thin as possible. The natural tendency of the fluke to bury itself is greatly aided by making the fluke 3 and fluke arm 2 smooth, thin, and with sharp edges. Initial penetration may be further aided by provided the fluke with a central sharp point 3' so that in hard bottom, penetration will start immediately. Due to the fact that the total weight of the anchor is small, the acute angle of this sharp point is of great help in preventing dragging immediately after bottom is contacted, and once penetration starts the anchor at once planes to its final position. The sharpness of the point, therefore, together with the thin fluke section adjacent thereto and angularity to bottom gives practically immediate penetration. The fluke arm is preferably of open and thin section as resistance to bottom penetration at this point causes a sharp limitation in the depth to which the fluke will bury itself with a corresponding decrease in holding power.

Advantages may be gained by the use of a stock or cross arm, having a substantial area normal to the shank. We prefer, therefore, to make the stock 4 of tri-angular section having a flat surface substantially normal to the shank. Such an arm is pulled into a soft bottom by the downward force of the fluke, and increases resistance to the forward motion of the anchor. The cross arm or stock 4 not only holds the fluke at such an angle as to engage the bottom and cause the point to enter, but is preferably made hollow and welded so as to be watertight. When the anchor is thrown overboard the buoyant force exerted by the hollow stock causes the anchor to fall, at reasonable depths, fluke down, so that the point will readily engage the bottom.

Referring again to the drawings for a more detailed description, the shank 1 is of U-shaped section and so formed that the opening of the U faces the fluke 3. We prefer to taper the shank so that it is slightly deeper at the junction of stock and fluke arm than at the attachment end. A cable may be attached to the free end of the shank by a shackle 5.

The anchor shown in Figures 1 to 5 is adapted to fold. The fluke 3 is welded or otherwise fastened to lips 6 formed on parallel fluke arm ribs 7. It is desirable to provide the fluke with a longitudinal stiffening bend 9 between the attachment points of the ribs 7. The free ends of the ribs 7 are preferably bent over toward each other and buttwelded, and a strengthening plate 10 welded across the buttweld. The fluke arm ribs 7 is adjacent the strengthening plate 10, and the shank 1 adjacent the large end, are provided with triangular apertures through which the triangular stock 4 may pass, thus locking the shank 1 to the fluke arm 2 in proper angular relation. The stock 4 has a centrally located depression 11, and the shank carries a spring 12 which has a projection 13 on its free end adapted to fall into the depression 11 when the stock is centrally located with respect to the shank and fluke arm. A re-enforcing strip 14 is fastened to the shank 1 around the triangular apertures to strengthen the shank at this point.

Given the anchor as shown in Figures 1 and 2, the procedure necessary to fold the anchor is as follows: The spring 12 is depressed, thereby allowing the stock to be completely withdrawn through the apertures in the fluke arm and shank. We prefer to fit this cross arm into the hollow portion of the shank for carriage. The fluke arm is then loose and slidable upon the shank and may be folded until the fluke lies flat with the shank. Center punches 15 are provided on both ends of the shank to prevent the fluke arm from sliding off and becoming separated from the shank. The anchor, thus dismantled, may be packed in an extremely small space.

Figures 6 to 10 show a double fluke anchor. In this case we prefer to make the shank 1 of two U beams 16, welded back to back. In this case, as in the single fluke anchor, the fluke arms 2 are formed of two fluke arm ribs 7, but they are not joined at their free ends. The shank is provided with a pair of pivot bolts 17, passing through an aperture in a corner of the ribs 7, and through the shank, to form a pivot for each arm. Ahead of and at right angles to the pivot bolts 17, fastened to the outside of the shank, are stock brackets 18 carrying cross arm pivot bolts 19 which pass through, on each side, a pair of locking plates 20 to which stock sections 21 are welded or otherwise fastened. We prefer to form these stock sections of reversed C-shape, the flat surface being normal to the shank with the open portion of the channel to the rear. On the end of each fluke arm rib opposite the pivot, is an oblong opening 22 which registers with a similar opening 23 in the shank when the fluke arm is in operating position. The end of each locking plate 20 is provided with a tongue 23 which is adapted to pass through the openings 22 and 23 when the stock sections stand at right angles to the shank. In order that the locking plates may remain in position, the tongue is provided with an offset 24, and the plates on each arm are slightly sprung toward each other so that when the tongues are in the apertures the offset catches under the shank wall and holds the locking plates in position.

Having the anchor of Figure 6 in erected position, the anchor may be dismounted by forcing each stock section inward so that the locking plates are spread and the offset released. The stock sections may then be folded down flat against the shank, the tongues being withdrawn from the apertures in the fluke arm ribs and the shank. This leaves the fluke arms free to pivot on the pivot bolts 17, and the flukes may then be folded in line with the sections and the shank.

Figures 7 and 9 show the attachment of the fluke to the fluke arm ribs, the attachment being practically the same as in the single fluke anchor of Figures 1 and 2. As in the double fluke type the mere presence of a cross arm or stock insures that one or the other of the flukes will engage the bottom; it is not necessary, in this case, that the stock have any buoyancy.

In operation, the anchor is thrown overboard and irrespective of whether the anchor is of the single or double fluke type, the point of the fluke will be in a position to engage the bottom and cause the point to enter.

Figure 12:
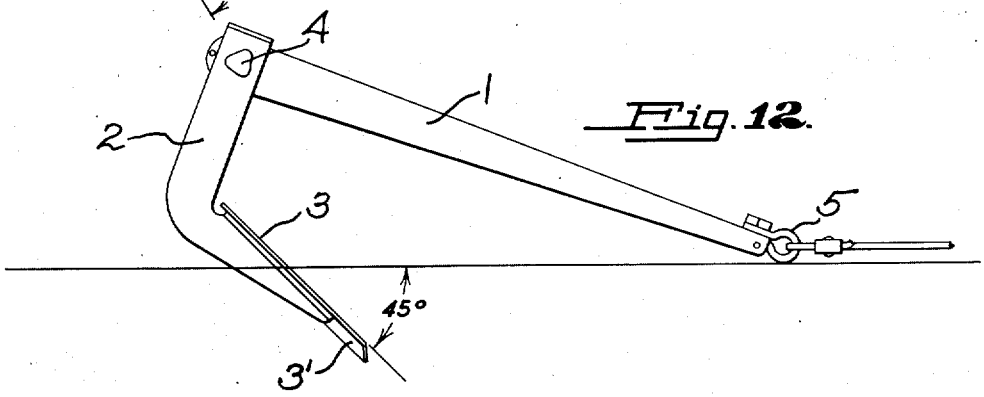
Figure 13:
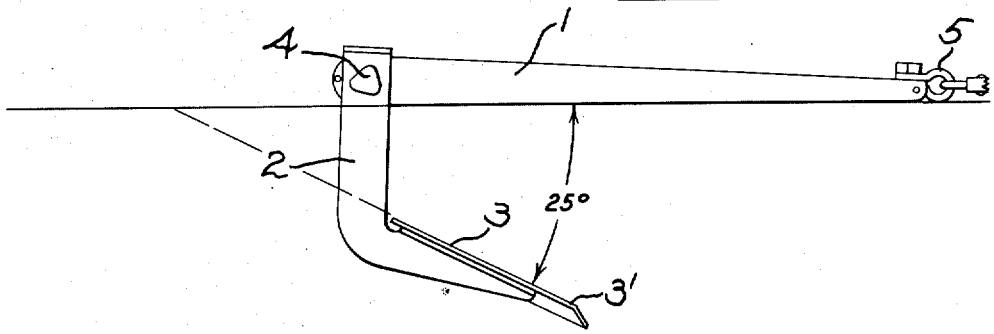

The position of the anchor shown in Figure 2, assumed on the bottom before penetration, will be substantially as shown in Figure 11 except that the anchor will have a slight tilt due to the fact that it must rest on 3 spaced points, namely the end of the fluke 3', one end of stock 4 and the anchor cable shackle 5. In this position the presentation angle of the fluke to bottom should be approximately 60° for best initial penetration, but this angle may vary a few degrees without greatly influencing the efficiency of initial penetration. Any appreciable increase of this angle, however, greatly lowers the ability of the anchor to start penetration. For example, if the angle is too large the fluke will not penetrate but will create a shallow furrow as it is dragged by a cable pull; if the angle is too small, the penetration will be shallow and the eventual angle assumed by the fluke when buried with the stock parallel to the bottom plane will be too small to provide holding power after full penetration. Consequently, we have found that the length ratios given above are vitally important in producing the initial presentation angle to bottom, whereas the fluke angle to shank is important in determining the holding power after full penetration. Changes in length of stock, for example, will change the initial presentation angle, but will not change the final holding angle. Thus, I have provided an anchor having a fluke angle fixed with relation to the shank when buried giving good holding power when buried, having a length of shank properly correlated with the correct distance from fluke tip to shank axis, which gives a proper initial penetration angle of the fluke to the bottom to best initial penetration. The same proportions give also the proper planing angle. Figures 11, 12 and 13 represent successive positions of the anchor of Fig. 2 as the anchor enters bottom, the bottom being represented by a horizontal line in each figure. Figure 11 shows the anchor resting on bottom on the digging end of the fluke and on cable shackle 5 before the application of a cable pull, and in this position the fluke makes an initial penetration angle of 60° to the bottom line. In this position the anchor will be tipped slightly to one side or the other, one end of the stock stabilizing the position.

As the cable load is applied, the anchor gradually turns about its shank axis to place the center line of the fluke almost directly below the shank, rotating the stock to a position above and practically parallel to bottom. As cable load is continued, the tip of fluke penetrates the bottom and the angle of fluke to bottom decreases, as shown in Figure 12, until the effective planing angle of approximately 45° is reached as the approximate the center of area of the fluke registers with the bottom plane. This planing angle is important, as it is at this time that the anchor will drag or furrow if penetration does not continue. The 45° planing angle at this stage of penetration insures further penetration until the fluke is buried. As the load continues, planing continues due to the efficient planing angle, until the shank 1 and stock 2 sink to the level of the bottom or below, with both stock and shank substantially parallel with the bottom plane, as shown in Figure 13. Thus, the effective angle of the fluke to bottom changes, during penetration, from approximately 60° at the beginning to approximately 45° when partly buried, and finally to approximately the fluke angle, after full penetration. Thus, the anchor rotates during penetration, with the cable connection as a pivot, while moving forward under the cable pull, measured in terms of its relative direction of motion in bottom.

To summarize, the length of shank, perpendicular distance of fluke tip to the shank, and fluke angle determine the presentation angle and best planing angle of the fluke to bottom, the stock holds the shank and fluke in upright position over the bottom, and the fixed fluke angle determines the final holding angle of the fluke after full penetration.

It is obvious that the condition existing after planing into bottom is stable and that dragging of the anchor will not cause it to turn and disengage as is the case with many stockless types.

In the anchor shown in Figures 1 and 2, the buoyant stock not only provides flotation but also provides a certain resistance to the anchor's passage through the water, and thus aids the anchor to fall, point down, when cast off in water of reasonable depth. This particular type of anchor is eminently suitable for temporary or emergency use, and has the advantage of compactness and light weight.

The location of the stock adjacent the fluke arms rather than at the opposite end of the shank, as is often the case, insures the burying of the stock in the bottom even at large angles of pull, and so further contributes to the holding power.

It is obvious that there are other means of locking and folding the various component parts of the anchor, and we do not wish to be limited to the particular construction shown, other constructions within the scope of the claims being apparent to those skilled in the art.

We claim:

1. An anchor comprising a fluke attached to a shank by a fluke arm, said anchor having a ratio of fluke length to shank length of approximately 1 to 2½, a ratio of fluke arm length to shank length of 1 to 3, and a fixed fluke angle of approximately 21°, whereby the holding power in penetrable bottom is substantially independent of weight.

2. An anchor comprising a fluke attached to a shank by a single fluke arm, said anchor having a ratio of fluke length to shank length of approximately 1 to 2½, a ratio of fluke arm length to shank length of 1 to 3, and a fixed fluke angle of approximately 21°, whereby the holding power in penetrable bottom is substantially independent of weight, and a stock extending through the junction of said arm and shank, at right angles thereto, said stock having a buoyant factor associated therewith sufficient to cause said anchor to fall through water fluke down.

3. An anchor comprising a single fluke attached to a shank by a fluke arm, and a stock passing through the junction of said arm and shank, said stock being hollow and water-tight and of sufficient buoyancy to cause the point of said fluke to contact bottom when dropped through water.

4. An anchor comprising a fluke attached to a shank by a fluke arm, and a stock passing through the junction of said arm and shank, said stock including at least two surfaces meeting and positioned to present the meeting edge to bottom with at least one of said surfaces substantially normal to the longitudinal axis of the shank, said surfaces being generally flat, the shapes and positions of said surfaces thereby providing a relatively high resistance to forward motion and relatively low resistance to downward motion when said stock is engaging the bottom with the fluke of said anchor buried therein.

5. An anchor comprising a fluke attached to a shank by a fluke arm, and a stock passing through the junction of said arm and shank adjacent an end of the shank, means for attaching a mooring means to the other end of the shank, said stock being provided with a flat surface facing in the direction of said first means and substantially normal to the longitudinal axis of the shank.

6. In an anchor having a fluke attached to a shank by a fluke arm, a stock passing through the junction of said arm and shank adjacent an end of the shank, means for attaching a mooring means to the other end of the shank, said stock being hollow and water-tight and provided with a flat surface facing in the direction of said first means and substantially normal to the longitudinal axis of the shank.

7. An anchor comprising a fluke attached to a shank by a fluke arm, said anchor having a ratio of fluke length to shank length of approximately 1 to 2½, a ratio of fluke arm length to shank length of 1 to 3, and a fixed fluke angle of approximately 21°, to proportion said parts so that a line drawn from the center of area of said fluke to the cable attachment end of said shank is at an angle of approximately 45° to the plane of said fluke, whereby the holding power in penetrable bottom is substantially independent of weight.

8. An anchor comprising a fluke attached to a shank by a fluke arm, said anchor having a ratio of fluke length to shank length of approximately 1 to 2½, a ratio of fluke arm length to shank length of 1 to 3, and a fixed fluke angle of approximately 21°, to proportion said parts so that a line drawn from the center of area of said fluke to the cable attachment end of said shank is at an angle of approximately 45° to the plane of said fluke, and so that a line connecting the digging end of said fluke and the end of said shank opposite to the fluke arm attachment thereto is at an angle of approximately 60° to the plane of said fluke, whereby the holding power in penetrable bottom is substantially independent of weight.

9. An anchor comprising a fluke attached to a shank by a fluke arm, said anchor having a ratio of fluke length to shank length of approximately 1 to 2½, a ratio of fluke arm length to shank length of 1 to 3, and a fixed fluke angle of approximately 21°, to proportion said parts so that said fluke is at an angle of approximately 60° to a line connecting the digging end of said fluke and the end of said shank opposite to the fluke arm attachment thereto, whereby the holding power in penetrable bottom is substantially independent of weight.

10. An anchor comprising a fluke attached to a shank by a fluke arm, said anchor having a ratio of fluke length to shank length of approximately 1 to 2½, a ratio of fluke arm length to shank length of 1 to 3, and a fixed fluke angle of approximately 25°, whereby the holding power in penetrable bottom is substantially independent of weight.

11. An anchor comprising a fluke attached to a shank by a fluke arm, said anchor having a ratio of fluke length to shank length of approximately 1 to 2½, a ratio of fluke arm length to shank length of 1 to 3, and a fixed fluke angle of approximately 21°, said fluke arm being shaped to have a relatively low resistance to movement of said fluke along the penetration path thereof during penetration into bottom, whereby the holding power in penetrable bottom is substantially independent of weight.

12. An anchor comprising a fluke attached to a shank by a single fluke arm, said anchor having a ratio of fluke length to shank length of approximately 1 to 2½, a ratio of fluke arm length to shank length of 1 to 3, and a fixed fluke angle of approximately 21°, whereby the holding power in penetrable bottom is substantially independent of weight, and a stock extending laterally on each side of said shank adjacent the junction of said fluke arm and shank.

13. An anchor comprising a fluke attached to a shank by a single fluke arm, said anchor having a ratio of fluke length to shank length of approximately 1 to 2½, a ratio of fluke arm length to shank length of 1 to 3, and a fixed fluke angle of approximately 25°, whereby the holding power in penetrable bottom is substantially independent of weight, and a stock extending laterally on each side of said shank adjacent the junction of said fluke arm and shank.

14. An anchor comprising a fluke attached to a shank by a fluke arm, said anchor having a ratio of fluke length to shank length of approximately 1 to 2½, a ratio of fluke arm length to shank length of 1 to 3, said fluke having a fluke angle to said shank fixed at approximately 21° under a cable pull during penetration, and a stock extending laterally from said shank and attached thereto adjacent the junction of fluke arm and shank, whereby the holding power in penetrable bottom is substantially independent of weight.

15. An anchor comprising a fluke attached to a shank by a fluke arm, said anchor having a ratio of fluke length to shank length of approximately 1 to 2½, a ratio of fluke arm length to shank length of 1 to 3, said fluke having a fluke angle to said shank fixed at approximately 25° under a cable pull during penetration, and a stock extending laterally from said shank and attached thereto adjacent the junction of fluke arm and shank, whereby the holding power in penetrable bottom is substantially independent of weight.

16. A light weight anchor comprising a shank, a cable attachment at one end of said shank, a fluke, and a fluke arm connected to said fluke and said shank and supporting said fluke at a fixed fluke angle of substantially 25° to said shank, said shank, said fluke and said fluke arm being so proportioned that said fluke is positioned so that a straight line drawn from the center of the area of said fluke to said cable attachment is at an angle of substantially 45° to the plane of said fluke, and so that a straight line drawn from the digging end of said fluke to said cable attachment is at an angle of substantially 60° to the plane of said fluke, whereby the holding power in penetrable bottom is substantially independent of weight.

17. A light weight anchor comprising a shank, a cable attachment at one end of said shank, a fluke, and a fluke arm having a minimum area normal to the line of movement of the anchor under pull and having a minimum area normal to the direction of penetration of the anchor and connected to said fluke and said shank and supporting said fluke at a fixed fluke angle of substantially 25° to said shank, said shank, said fluke, and said fluke arm being so proportioned that said fluke is positioned so that a straight line drawn from the center of the area of said fluke to said cable attachment is at an angle of substantially 45° to the plane of said fluke, and so that a straight line drawn from the digging end of said fluke to said cable attachment is at an angle of substantially 60° to the plane of said fluke, whereby the holding power in penetrable bottom is substantially independent of weight.

18. A light weight anchor comprising a shank, a cable attachment at one end of said shank, a fluke, and a fluke arm including a pair of thin metal members attached to and extending from opposite sides of the shank to that side of the fluke away from the cable attachment, said metal members having their largest surfaces in planes parallel to the longitudinal axis of the shank, and connected to said fluke and said shank and supporting said fluke at a fixed fluke angle of substantially 25° to said shank, said shank, said fluke, and said fluke arm being so proportioned that said fluke is positioned so that a straight line drawn from the center of the area of said fluke to said cable attachment is at an angle of substantially 45° to the plane of said fluke, and so that a straight line drawn from the digging end of said fluke to said cable attachment is at an angle of substantially 60° to the plane of said fluke, whereby the holding power in penetrable bottom is substantially independent of weight.

JOHN K. NORTHROP.
HARRY M. GESNER.